Aug. 25, 1931. G. A. RILEY 1,820,092
LICENSE PLATE HOLDER AND PROTECTOR
Filed April 21, 1930
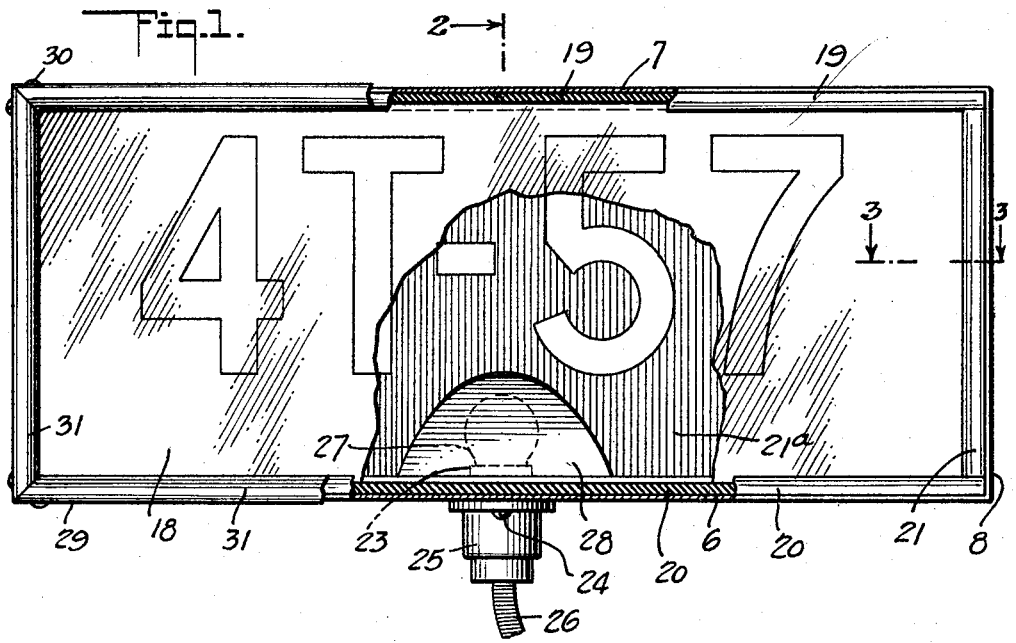
INVENTOR.
GERALD A. RILEY
BY
ATTORNEYS.

Patented Aug. 25, 1931

1,820,092

UNITED STATES PATENT OFFICE

GERALD A. RILEY, OF LOS ANGELES, CALIFORNIA

LICENSE PLATE HOLDER AND PROTECTOR

Application filed April 21, 1930. Serial No. 446,089.

My invention relates to license plate holders and protectors for automobiles and has for its primary object the provision of novel and effective means for giving maximum visibility to the plate at all times and for protecting same from the effect of the elements.

Another object of the invention is to provide a device of this character having means for illuminating the plate so that the indicia contained thereon will appear perfectly legible at night time so that it may be clearly read from a great distance.

Another object of the invention is to provide a device of this character including a simple arrangement of positively acting parts and instrumentalities mutually serving to deaden the effect of vibration and for protecting the display panel against the action of sudden shocks and jars.

A still further object of the invention is to provide a license plate holder and protector which will readily adapt itself to license plates of standard size and which will have incorporated therein means for quickly enabling one to substitute one plate for another as may be lawfully required from time to time.

A still further object of the invention is to provide a license plate holder and protector which will be light, strong and durable, ornamental and attractive when applied, and exceedingly inexpensive of manufacture.

In the accompanying drawings,

Figure 1 is a view in front elevation of my improved license plate holder and protector, with parts broken away and parts shown in section;

Figure 2 is a section taken substantially on line 2—2 of Figure 1, parts being shown in elevation; and Figure 3 is a detail section taken substantially on line 3—3 of Figure 1.

In carrying the invention into practice, use is made of a casing 5, the bottom wall 6 of which is wider than the top wall 7 thereof and whose side walls 8, 8, are of a gradually increasing width towards said bottom wall 7. This provides for a downward and forward inclination of the display side of the casing, the object of which will appear presently. The wall 9 of said casing carries a strap 10 having its medial portion offset at 11 and formed with a central aperture for the accommodation of a threaded stem 12 of a bracket arm 13, the latter intended to be attached in the customary manner to some suitable part of an automobile with which the license plate is used. In order to hold the casing securely connected with the bracket arm 13, I employ a clamp nut 14 which is adjustable on the stem 12 and against one side of the offset 11. In order that the casing and the aforementioned bracket arm may be held against relative rotation, I provide the arm with a shoulder 15 which may be drawn tightly against the opposite side of the offset 11 so that the lugs 16 on said shoulder may enter the spaced apart retaining recesses 17 formed in said offset.

I have now described a casing which is open at what I shall hereinafter refer to as the display side, and as illustrated, the said display side is normally closed by a transparent panel 18, the edges of which find yielding purchase against top and bottom rubber strips 19 and 20, respectively, and similar end strips 21. All of the aforementioned strips are relatively thick so that they constitute effective cushions that will preserve the panel 18 against damage incident to shocks, jars and vibrations. It will be observed also that the strips follow the shapes of the walls 6, 7 and 8 of the casing so that their edges come substantially flush with the display side of said casing. It will also be observed that the display panel 18 assumes an inclination corresponding with that of the said display side of the casing in order that the license plate 21 may be clearly visible when viewed from a point above the plane of the display side of said casing. The said license plate 21$^a$, which, of course, forms no part of the present invention, is also arranged so that its edges take yielding purchase against the rubber strips 19, 20 and 21. In this manner, the edges of the license plate and the edges of the display panel crowd themselves against surfaces of said rubber strip in a way that affords absolute confinement of the plate and the said panel in the casing. The arrangement also serves to maintain a position of spaced relationship between the plate and the panel. This cushioning effect of the rubber strips serves further as an anti-rattling means and prevents the creation of objectionable noises.

The bottom strip 20 is formed with an aperture 22 into which the element 23 of the socket member projects, the said element being removably joined at 24 to the co-acting socket element 25, the latter being exteriorly exposed from the casing and is adapted to receive circuit wires 26, whereby current may be fed to a lamp 27. Said lamp 27 is removable from the element 22 and, as illustrated, the lamp is positioned between the display panel 18 and the said license plate so that when same is lighted the entire license plate will be fully illuminated. To accelerate illumination of the plate I provide the element 22 with a reflector 28 which extends angularly in a direction toward the said display panel.

When inserting the plate 21 within the casing 5, the coacting socket elements 23 and 25 are separated relatively, the element 22 being permitted to remain upon the strip 20. The strips 19, 20 and 21 are then removed from the casing and the same are then associated with the respective edges of the license plate 21 and the respective edges of the display panel 18, the said strips combining to constitute a sort of frame for the said plate 21 and the aforementioned display panel 18. When this is accomplished, the entire structure may be slidably inserted into the casing until same occupies the position shown clearly in Figure 2. I then re-associate the element 25 with the element 22, in order that operative circuit connections may be re-established with the lamp 27. Also, I then secure positive confinement of the parts within the casing by means of removable molding strips 29 which are placed about the marginal edges of the casing and detachably secured thereto by the fastenings 30. These molding strips have portions 31 which are forcibly presented against the adjacent edges of said strips 19, 20 and 21.

By virtue of certain police ordinances, it is required that the license indicia contained upon a license plate be clearly visible at all times. Heretofore, it has been difficult to satisfactorily illuminate such plates and to provide for clear visibility of the contained indicia. It manifestly follows that by the means herein described the license plate is contained permanently within a dust- and moisture-proof container whereby it will be protected against corrosive action induced by the elements and against the obliterating effect of dusty accumulations. The panel 18 permits the license indicia upon the plate to be clearly viewed under all conditions. At night, complete illumination of the plate is had by reason of the lamp 27. The panel 18 is such that it may be subjected to the cleansing effect of water, and by mounting same with respect to the aforementioned strips 19, 20 and 21, the display side of the casing is positively sealed against the entrance of water to the casing.

I claim as my invention:

1. A license plate holder and protector comprising a rectangular casing having an open front, strips of resilient material bounding the top, bottom and ends of the casing within the latter and each having a pair of spaced apart longitudinally extending grooves in one of which a license plate is adapted to be received and supported adjacent the rear wall of the casing, a transparent panel seated in the other groove of the strips and yieldingly supported by the latter in spaced relation to the license plate and adjacent the front of the casing, a lamp interposed between the transparent panel and the license plate for illuminating the latter, and molding strips detachably secured to the casing and having flanges pressing against the outer edges of the resilient strips to clamp the latter against displacement in the casing and provide a watertight seal.

2. A license plate holder and protector comprising a rectangular casing having an open front, strips of resilient material bounding the top, bottom and ends of the casing within the latter and each having a pair of spaced apart longitudinally extending grooves in one of which a license plate is adapted to be received and supported adjacent the rear wall of the casing, a transparent panel seated in the other groove of the strips and yieldingly supported by the bottom in spaced relation to the license plate and adjacent the front of the casing, one of the resilient strips and one wall of the casing having registered openings, a socket element in the opening of the resilient strip, a second socket element exteriorly of the casing in registration with said opening of the latter, means accessible from exteriorly of the casing for detachably securing the socket elements together, a lamp supported in the first mentioned socket element and supported by the latter in the casing between the transparent panel and license plate, and molding strips detachably secured to the casing and having flanges pressing against the outer edges of the resilient strips to secure the latter against displacement in the casing and provide a watertight seal.

GERALD A. RILEY.